(No Model.) 2 Sheets—Sheet 1.

G. W. BUGBEE & F. DANNER.
DRAWER FITTING MACHINE.

No. 417,983. Patented Dec. 24, 1889.

Attest
J. Watson Sims
M. E. Millikan

Inventors
George W. Bugbee
Frederick Danner
by Wood & Boyd
their Attorneys (No Model.) 2 Sheets—Sheet 2.
G. W. BUGBEE & F. DANNER.
DRAWER FITTING MACHINE.
No. 417,983. Patented Dec. 24, 1889.
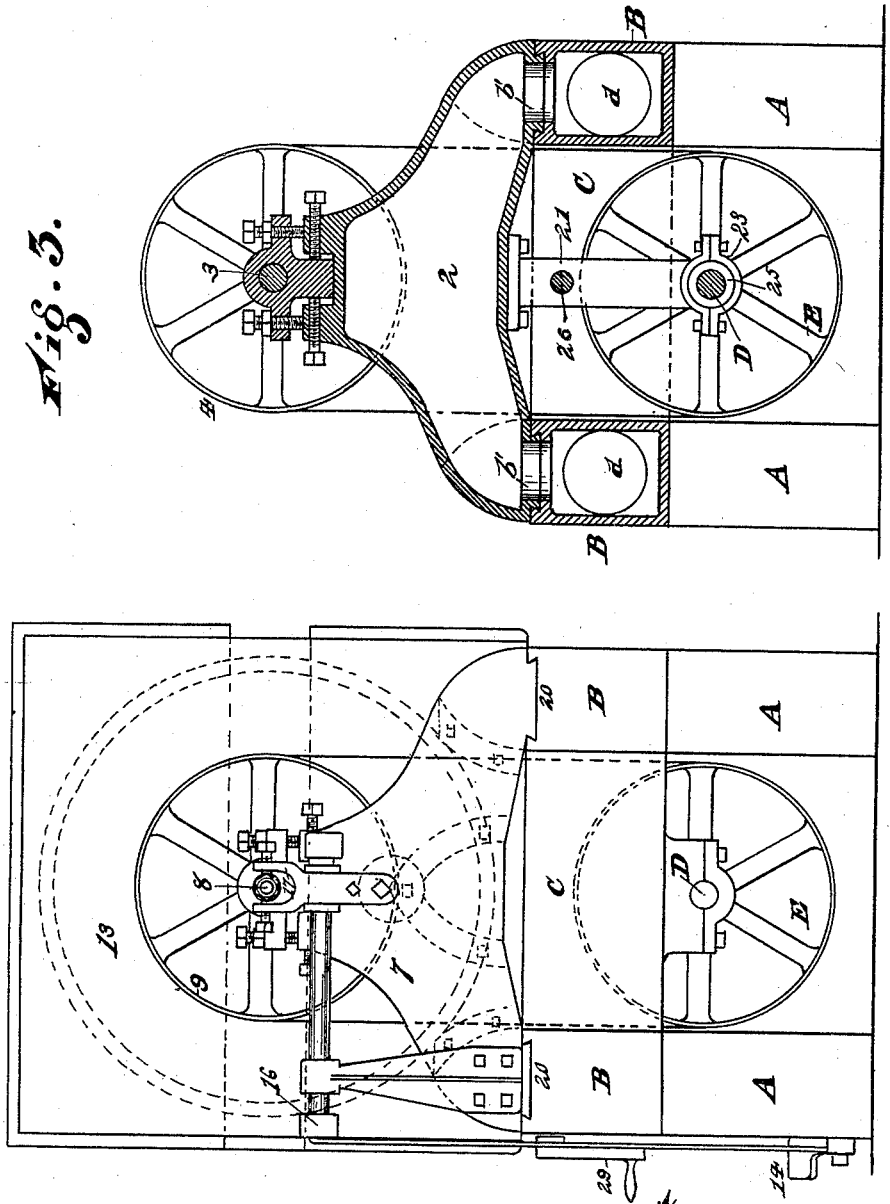

UNITED STATES PATENT OFFICE.

GEORGE W. BUGBEE AND FREDERICK DANNER, OF CINCINNATI, OHIO, ASSIGNORS TO THE EGAN COMPANY, OF SAME PLACE.

DRAWER-FITTING MACHINE.

SPECIFICATION forming part of Letters Patent No. 417,983, dated December 24, 1889.

Application filed February 9, 1888. Renewed May 8, 1889. Serial No. 310,075. (No model.)

*To all whom it may concern:*

Be it known that we, GEORGE W. BUGBEE and FREDERICK DANNER, residents of Cincinnati, in the county of Hamilton and State of Ohio, have invented certain new and useful Improvements in Drawer-Fitting Machines, of which the following is a specification.

The object of our invention is to construct sand-paper disks on separate shafts, avoiding a shaft between the two disks carrying the sand-paper. Another object of our invention is to provide suitable means for adjusting one of the disks so as to regulate the pressure on the work. Another object is to provide means for getting rid of the dust, all of which will be explained in the description of the accompanying drawings, making a part of this specification, in which—

Figure 1:
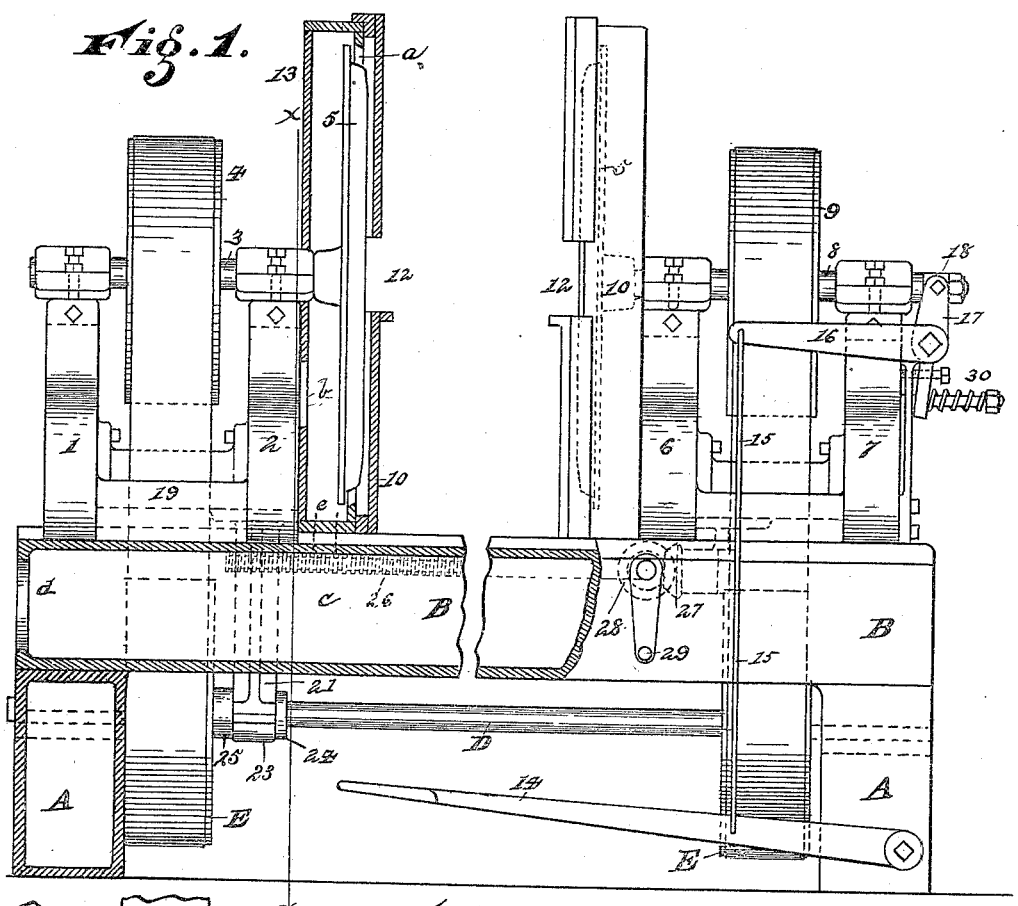
Figure 4:
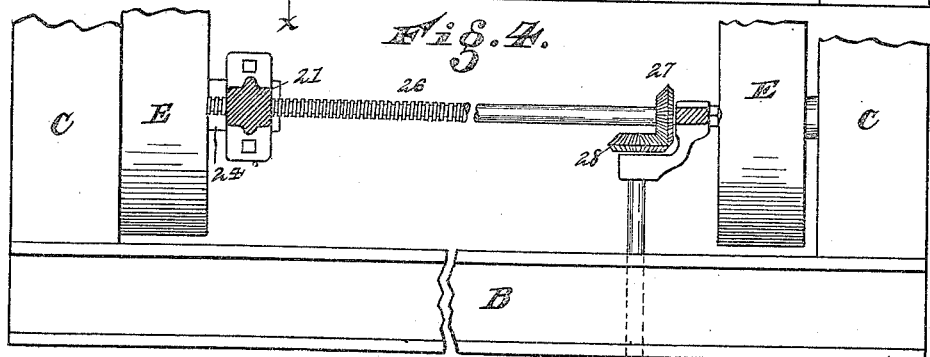

Figure 1 is a front elevation, partly in section. Fig. 2 is an end elevation. Fig. 3 is a section on line x x, Fig. 1. Fig. 4 is a top plan view of the sills.

A represents the posts, B the side sills, and C the end sills, of the frame. The side sills, one or both, are made hollow, so as to serve as a dust-conveyer.

D represents a counter-shaft journaled to sill C. E E represent driving-pulleys keyed to said shaft D. The pulley for driving said shaft is not herein shown.

1 and 2 represent journal-brackets, on which is journaled shaft 3. 4 represents a driving-pulley keyed to said shaft. 5 represents a sand-paper disk mounted on said shaft.

6 and 7 represent brackets securely attached to the frame, on which is journaled the shaft 8, carrying driving-pulley 9. A similar sand-paper disk is mounted on said shaft 8.

10 represents a housing formed around the disks, so as to prevent the escape of dust. They are provided with an opening 12 at the center, through which a drawer or other articles to be dressed are passed. The openings also serve as a guide and rest.

In order to carry off the dust by pipes, we have provided the following instrumentalities: The dust-boxes are made of two sections 10 and 13, and they are provided with annular openings $a$ around the periphery of the disks. The dust escapes through the openings into the dust-box 13, thence out through openings, say, at $b$, then into the bracket 2, which is made hollow, thence through openings $b'$ into the hollow $c$ of sills B. $b$ represents an exit-orifice, to which the dust-pipe is connected, and an ordinary fan is employed to suck or draw away the dust. Instead of having the exit-orifice $b$ in the vertical wall of the section 13 of the dust-box, such exit-opening may be in the bottom wall of said section and communicate with the hollow side sill B, as indicated by the dotted lines $e$, Fig. 1.

In order that the pressure on the work may be controlled, we have provided a foot-lever 14, connecting-rod 15, crank-arm 16, link 17, attached to a collar 18, surrounding the shaft 8 and enabling it to be moved longitudinally in its bearings as the shaft is moved laterally toward the opposite sand-paper disk, increasing the pressure on the work. The amount of pressure is controlled by the foot-lever.

In order that one of the disks may be adjusted to suit different sizes of stuff to be dressed, we provide the following: The brackets 1 and 2 are secured together by girts 19, and the brackets are provided with dovetailed tenons 20, fitting in similar-shaped guides in the sills B. 21 represents a standard rigidly bolted to the bracket 2. 23 represents a journal-box formed on the bottom of standard 21. 24 represents the hub of a grooved sleeve 25, which is splined upon the shaft D. 26 represents a screw-threaded shaft, which is driven by bevels 27 and 28 and crank 29. As the screw-shaft 26 is revolved it moves the hanger 21, and with it the brackets 1 and 2, thereby moving the shaft 3 and disk 5 to and from on the bed of the machine. The sleeve 25 is rigidly attached to the hub of the driving-pulley E, so that it and the driving-pulley 4 are moved in unison whenever the disk 5 is adjusted longitudinally. 30 represents a spring bearing against the free end of link 17 for holding the shaft 8 normally to its outer position of adjustment.

Having described our invention, what we claim is—

1. In combination with the sand-paper disk 5, the housing inclosing the same provided with annular orifices $a$ near the periphery of the disk, and the dust-exit orifice $b$, leading to a conveying-pipe, substantially as specified.

2. In combination with the sand-paper disk 5, the housing inclosing the same provided with annular orifice $a$ near the periphery of the disk, and the dust-exit orifice $b$, and the hollow side sill B, in communication with said exit-orifice, and provided with an outlet-orifice $d$, substantially as specified.

3. The combination of the adjustable connected brackets 1 and 2, the shaft 3, journaled on the brackets and carrying the pulley 4 and disk 5, the rotary counter-shaft D, having the adjustable pulley E, provided with an attached sleeve 25, through which the counter-shaft passes, the hanger 21, connected to one of the brackets and journaled to the sleeve on the counter-shaft, and the rotary screw-rod 26, screw-threaded in the hanger, substantially as described.

4. The combination of supporting-sills B, adjustable connected brackets 1 and 2, having a sliding connection with said sills, a shaft 3, journaled on the brackets, a sandpapering-disk 5, and driving-pulley 4, both rigidly fixed on the shaft, a hanger 21, secured to and depending from one of the brackets, a shaft 26, screw-threaded through the hanger, a bevel-gear 27 on the screw-shaft, and a hand-crank 29, provided with a bevel-gear 28 for rotating the screw-shaft at will independent of the shaft carrying the disk, substantially as described.

In testimony whereof we have hereunto set our hands.

GEORGE W. BUGBEE.
   FREDERICK DANNER.

Witnesses:
 ROBERT ZAHNER,
 J. WATSON SIMS.